UNITED STATES PATENT OFFICE.

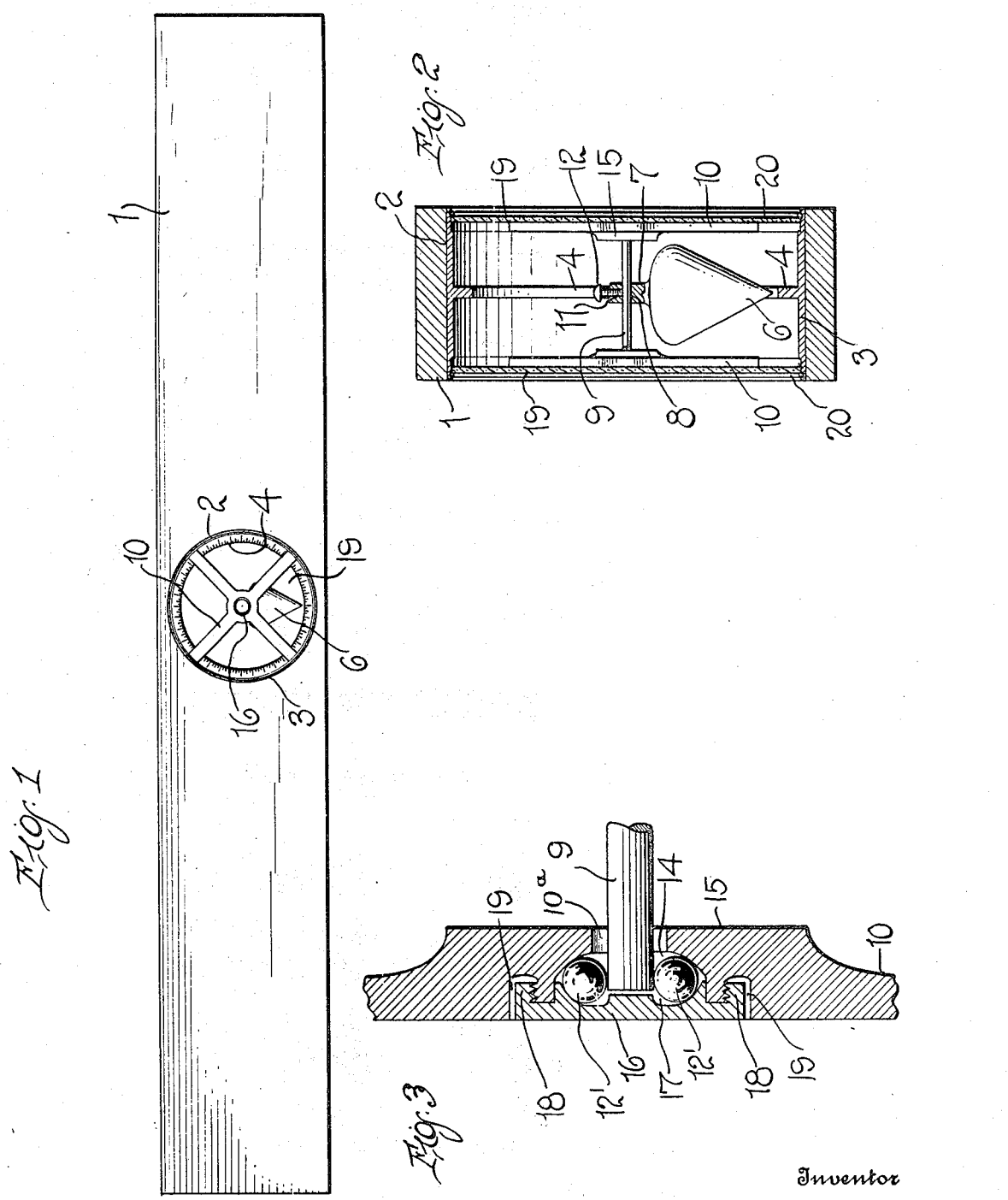

JOHN P. OHNEMUS, OF VINCENNES, INDIANA.

BALL-BEARING.

1,146,510. Specification of Letters Patent. Patented July 13, 1915.

Application filed May 8, 1914. Serial No. 837,284.

*To all whom it may concern:*

Be it known that I, JOHN P. OHNEMUS, a citizen of the United States, residing at Vincennes, in the county of Knox and State of Indiana, have invented certain new and useful Improvements in Ball-Bearings, of which the following is a specification, reference being had to the accompanying drawings.

This invention relates to certain improvements in ball bearings and the object of the invention is to provide a device of this general character of novel and improved means whereby the same may be assembled with convenience and facility and afford a maximum of efficiency.

The invention consists in the details of construction and in the combination and arrangement of the several parts whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is an elevational view of a plumb level having applied thereto ball bearings constructed in accordance with an embodiment of my invention; Fig. 2 is a vertical sectional view taken through the device as herein disclosed; Fig. 3 is an enlarged fragmentary view, partly in section and partly in elevation, illustrating in detail a ball bearing, as herein embodied.

As disclosed in the accompanying drawings 1 denotes a stock of predetermined dimensions and provided at substantially its axial center with the transverse circular opening 2, in which is adapted to be snugly accommodated the cylindrical casing or shell 3 having its inner face provided, at substantially its transverse center, with the inwardly projecting annular flange 4, the opposite faces whereof being provided with the degree graduations with which the bob 6 is adapted to coöperate in a manner which is believed to be clearly disclosed in the drawings.

As herein disclosed, the bob 6 is provided with the stem 7 provided with the transverse opening 8 through which projects a shaft 9, the opposite extremities thereof being directed through the openings 10ª produced at the axial centers of the spiders 10 suitably positioned across the opposite faces of the casing or shell 3. The stem 7 is also provided with a longitudinal opening 11 having in threaded engagement therewith the clamping screw 12 whereby it will be readily perceived that the bob 6 may be readily and conveniently applied in operative position and clamped in its requisite adjustment relative to the annular flange 4.

In order that the shaft 9 may rotate with a minimum of friction in order to increase the efficiency of the plumb level, I find it of advantage to have coacting with the extremities thereof, the anti-friction members 12′, herein disclosed as spherical bodies, adapted to travel in the race-way 14 produced in the hub 15 of each of the spiders 10, such hubs having coacting therewith the bearing caps 16 provided with the race-way 17 adapted to register with the race-way 14 of the hub 15. As herein set forth, the cap 16 is provided with the annular flange 18 adapted to be received within an annular recess 19 in the outer face of the hub, the adjacent faces of the flange and recess being threaded whereby it will be readily perceived that the cap 16 may be applied to or removed from operative position with convenience and facility and whereby it will be readily perceived that the shaft 9 may be assembled or removed with convenience and facility.

The upper faces of the shell or casing 3 are, as herein embodied, adapted to be closed by the transparent members 19, preferably of glass, which, as herein set forth, are maintained in operative position through the medium of the rings 20.

From the foregoing description, it is thought to be obvious that a ball bearing constructed in accordance with my invention is of an extremely simple and comparatively inexpensive nature and is particularly well adapted for use by reason of the convenience and facility with which it may be assembled and by reason of the effectiveness with which it performs its functions, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice except as defined by the appended claim.

I claim:

A device of the character described including a casting having an opening and provided with a race-way and having a concentric recess in the outer face thereof, a wall of the recess being threaded, an imperforate bearing cap provided with an annular flange adapted to be received within the concentric recess and having a race-way adapted to register with the race-way of the casting, a face of the flange being threaded to engage the threaded wall of the recess, a shaft having an extremity disposed through the opening of the bearing, and anti-friction members positioned within the registering race-way and in contact with the shaft.

In testimony whereof I hereunto affix my signature in the presence of two witnesses.

JOHN P. OHNEMUS.

Witnesses:
 COURTNEY L. MONTGOMERY,
 CARRIE O. DOREY.